Jan. 10, 1939.  R. P. NORTON  2,143,570
VALVE REFACING TOOL
Filed Jan. 24, 1938
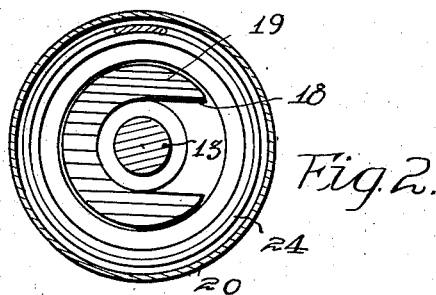
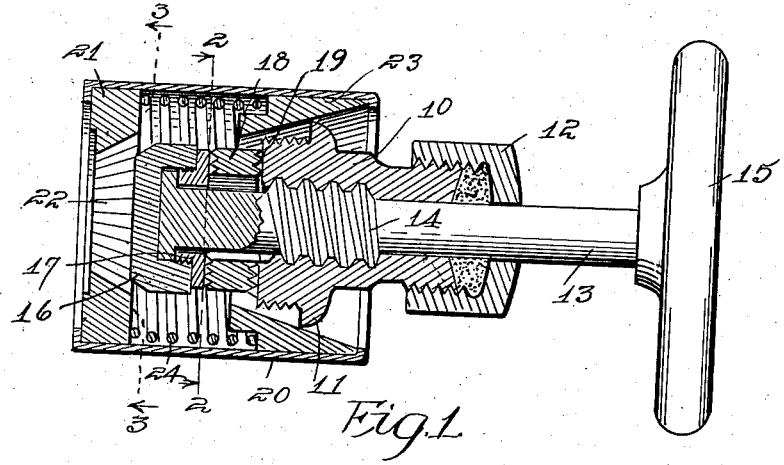
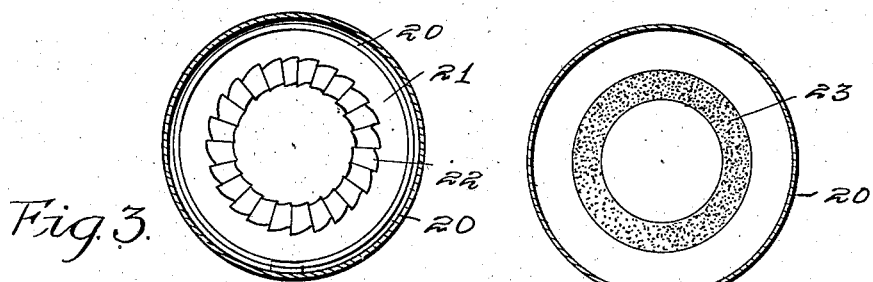
Inventor
Raymond P. Norton Patented Jan. 10, 1939

2,143,570

UNITED STATES PATENT OFFICE 2,143,570

VALVE REFACING TOOL

Raymond P. Norton, Algona, Iowa

Application January 24, 1938, Serial No. 186,519

3 Claims. (Cl. 90—12.5)

My invention relates to the art of refacing conical valve discs. A large number of manufacturers are now making conical valves and the relative proportion of these valves vary to a considerable extent, with the result that it is the present practice to provide a separate valve refacing tool properly proportioned to accommodate the valves of one manufacturer, and not adapted for use with valves of slightly different proportions.

The object of my invention is to provide a valve refacing tool of simple, durable and inexpensive construction and capable of automatical adjustment to accurately hold and regrind conical valves of widely different proportions and shapes.

In the accompanying drawing—

Figure 1 shows a central longitudinal sectional view of a conical valve and my conical valve refacing device in position therein as required in use;

Figure 2 shows a transverse sectional view on the line 2—2 of Figure 1;

Figure 3 shows a sectional view on the line 3—3 of Figure 1; and

Figure 4 shows a view similar to Figure 3 illustrating a modification.

Conical valves of the kind for which my improved valve-refacing tool was designed are customarily composed of a valve bonnet 10, having a circular rib 11 on its outer surface, a packing gland 12 at one end, and a valve stem 13 extended through the packing gland and the bonnet and formed with a screw-thread 14 seated in the interior of the bonnet. On one end of the valve stem is the hand-wheel 15, and on the other end is the conical valve disc 16. This is rotatably mounted upon the valve stem and held with the usual nut 17. When the valve stem is screwed in one direction, the conical valve disc is moved away from the valve bonnet.

It is necessary in connection with my improved valve-refacing device, that some means be provided for holding the conical valve disc in fixed position with relation to the valve stem, and for this purpose I have provided a valve head locking device indicated by the numeral 18 and being of substantially U shape in general outline and roughened on both sides, as shown at 19. This locking device is of such size that it can be readily and easily placed in position partially surrounding the valve stem and between the conical valve disc in the adjacent portion of the valve bonnet. Then the operator may grasp the bonnet in one hand and hold it against rotation and turn the valve stem to position for moving the conical valve disc toward the valve bonnet and in firm engagement with both the valve disc and the valve bonnet, thereby locking the valve disc against rotation. The opposite faces of the locking device are parallel and the inner end of the bonnet and the adjacent surface of the nut 17 of the valve head are at right angles to the longitudinal axis of the valve stem, hence, when the locking device is being placed in locked position the valve head is moved to and firmly held in proper position relative to the valve stem.

For supporting the cutter head I have provided a cylindrical body portion 20, and the cutter head 21 is mounted therein and provided with the customary conical opening provided on its inner surface, with cutter teeth 22 of the usual construction.

Slidingly mounted within the opposite end of the body 20 is the bonnet-centering guide 23 formed with a centrally arranged conical opening, and between the cutter head 21 and the bonnet-centering guide 23, and within the body 20, is an extensile coil spring 24.

In practical use, and when it is desired to reface a conical valve, the operator removes the bonnet and its valve stem and valve disc, and then inserts the valve head locking device and screws the valve stem to position for causing the locking device to hold the conical valve disc against rotation relative to the valve stem. He then inserts the valve disc and stem and bonnet into the body 20 until the circular outer surface of the valve bonnet engages the conical centering guide.

With the valves now in common use, the distance between the rib 11 on the bonnet 10, and the conical valve disc, varies to a considerable extent on valves even of the same diameter of the valve disc, and yet it is necessary that the valve bonnet be accurately centered and guided during a refacing operation. With my improvement, the operator simply presses upon the valve stem and compresses the spring 24 and moves the valve bonnet and the centering guide toward the cutter head. Hence, it makes no difference how much travel in this direction occurs before the valve disc actually engages the cutter head, because at all times the valve bonnet is securely held and centered in the bonnet-centering guide. When the valve bonnet is forced into the cone guide it may be out of alignment with the longitudinal axis of the refacing tool body. However, the valve stem and bonnet are tiltable within the bonnet guide, when the valve head is pressed into contact with the conical valve reseater head, then the valve head and the valve stem are tilted to position with the valve stem in alignment with the longitudinal axis of the valve reseating body and accurately held in that position by the centering action of the conical guide upon the valve bonnet and the centering action of the conical valve reseater upon the valve head, and when the valve stem is rotated and pressed toward the valve reseater, the cutting or grinding action is accurately applied.

In Figure 4 I have illustrated a modified form of cutter head in which, instead of the cutter teeth 22, I employ an abrasive or roughened surface 25, which may be of abrasive cloth or the like.

In actual practice I have found that with my improvement substantially all of the various makes of conical valves of substantially a given diameter of valve disc, may be readily, quickly and easily refaced, regardless of the varying diameters of the bonnet and the various distances between the bonnet and the conical valve disc.

I claim as my invention:

1. A valve refacing tool comprising a body, a conical cutter head therein, a valve bonnet-holding, centering and guiding device having a conical opening therein to receive and engage a valve bonnet and being movable toward and from the cutter head, and a locking device shaped to be detachably inserted between a valve head and a valve bonnet and securely hold the valve head against rotation relative to the valve bonnet when the valve bonnet is moved toward the valve head.

2. A valve refacing tool, comprising a valve stem, a bonnet in which the stem is seated by screw threads, the inner face of the bonnet being at right angles to the axis of the stem, a valve head having a conical valve disc rotatably and tiltably mounted on the inner end of the valve stem and having its outer surface arranged at substantially right angles to the axis of the valve stem, a locking device having parallel opposed faces and shaped to be detachably inserted between the bonnet and valve head and have its said opposed faces engaged by the bonnet and valve head when one of them is moved toward the other, and to tilt the valve head to position with its outer surface at right angles to the axis of the valve stem and there securely hold it, a valve refacing body, a conical cutter therein, and a valve bonnet-holding and centering device mounted in the valve body for movement toward and from the cutter and having a conical opening to receive and engage the valve bonnet.

3. A valve refacing tool, comprising a body, a head thereon having a conical opening provided with valve refacing means, and a bonnet guide mounted in the body for movement toward and from said head and formed with a conical opening for engagement with the outer surface of a valve bonnet for centering the bonnet relative to the guide and for permitting tilting movements of the bonnet relative to the guide, to thereby permit the valve to be tilted to an accurately aligned position when forced into the cone-shaped refacing head, and be held in said position at the point of contact of the bonnet with the guide and the point of contact of the valve head with the refacing head during the rotary movement of the valve in the operation of refacing the valve.

RAYMOND P. NORTON.